Sept. 18, 1956 C. A. OSTLING ET AL 2,763,317
METHOD AND APPARATUS FOR FORMING TIRES
Filed Aug. 10, 1953 6 Sheets-Sheet 1

INVENTORS
CARL A. OSTLING
HOLLIS C. HODGKINS
BY Irwin M. Lewis
ATTORNEY

Sept. 18, 1956  C. A. OSTLING ET AL  2,763,317
METHOD AND APPARATUS FOR FORMING TIRES
Filed Aug. 10, 1953  6 Sheets-Sheet 2
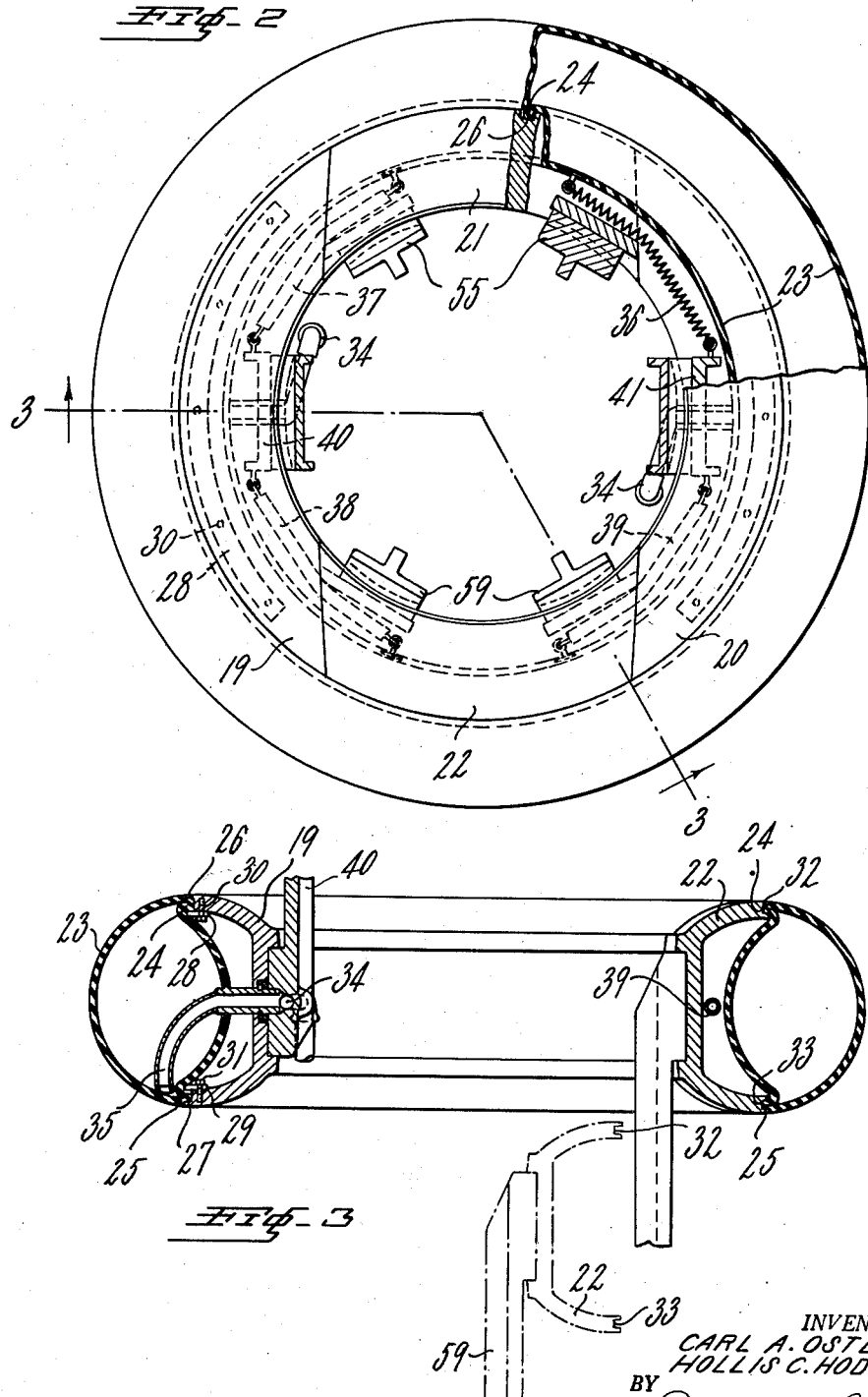
INVENTORS
CARL A. OSTLING
HOLLIS C. HODGKINS
BY
Irvin M. Lewis
ATTORNEY Sept. 18, 1956     C. A. OSTLING ET AL     2,763,317
METHOD AND APPARATUS FOR FORMING TIRES
Filed Aug. 10, 1953     6 Sheets-Sheet 3
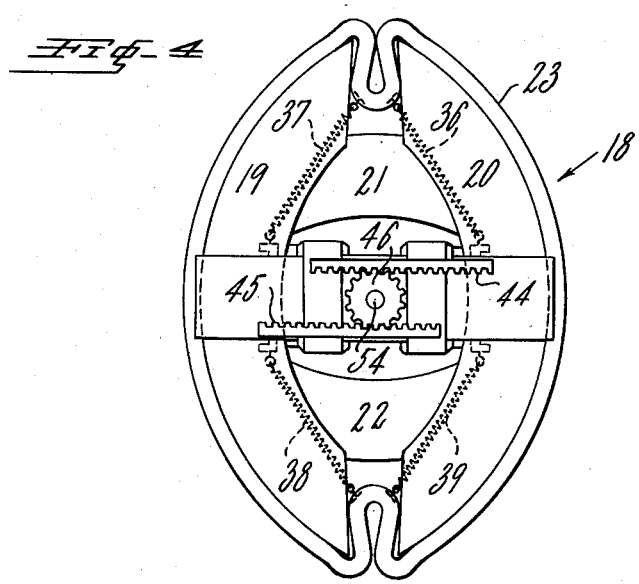
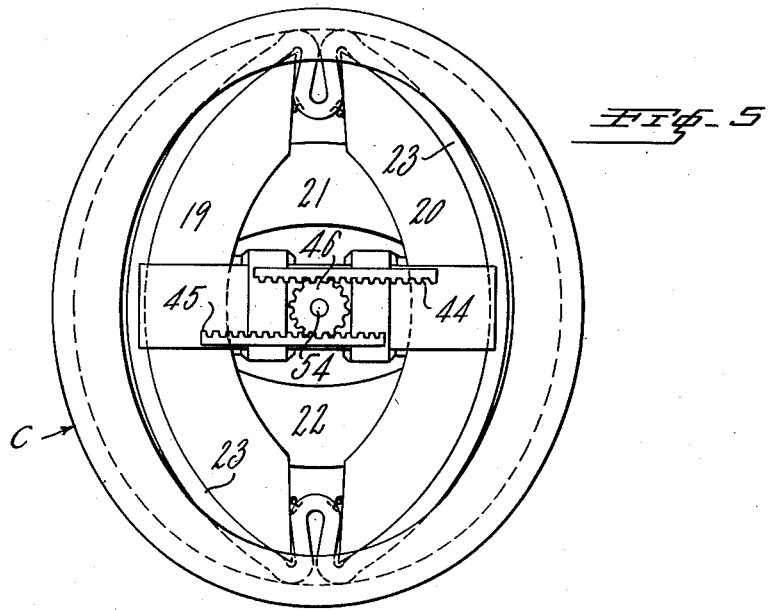
INVENTORS
CARL A. OSTLING
HOLLIS C. HODGKINS
BY
*Irwin M. Lewis*
ATTORNEY

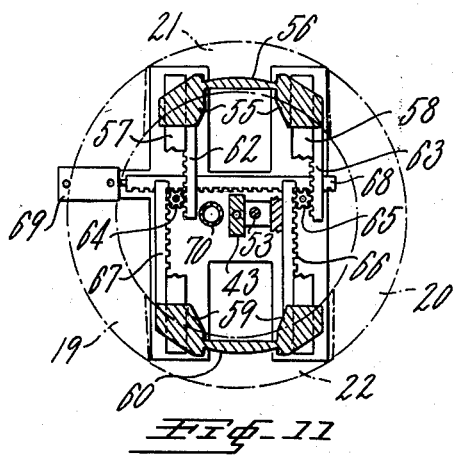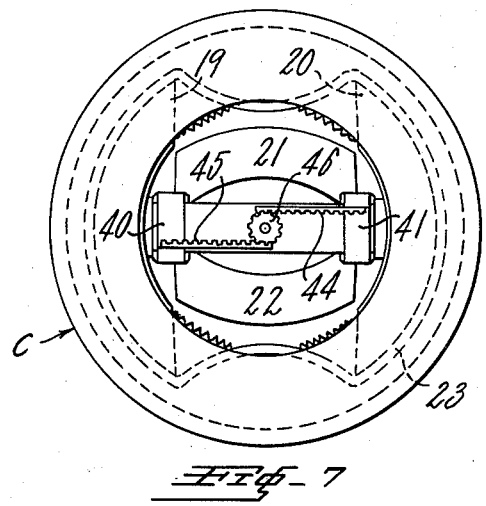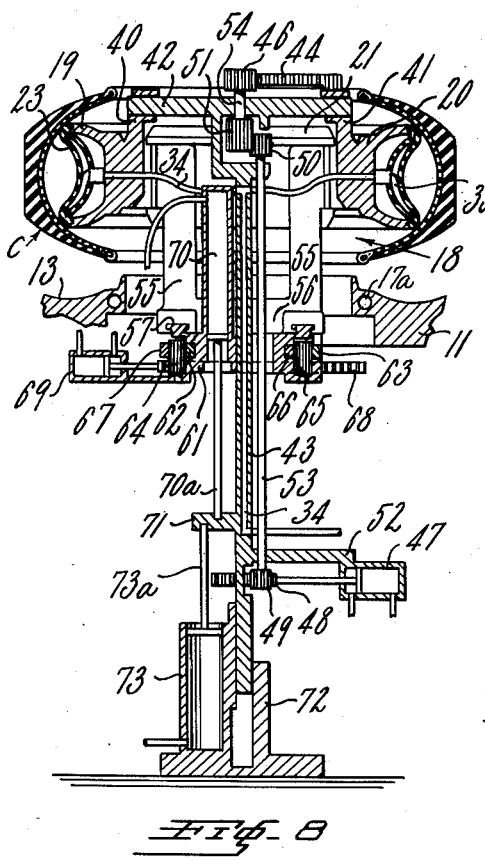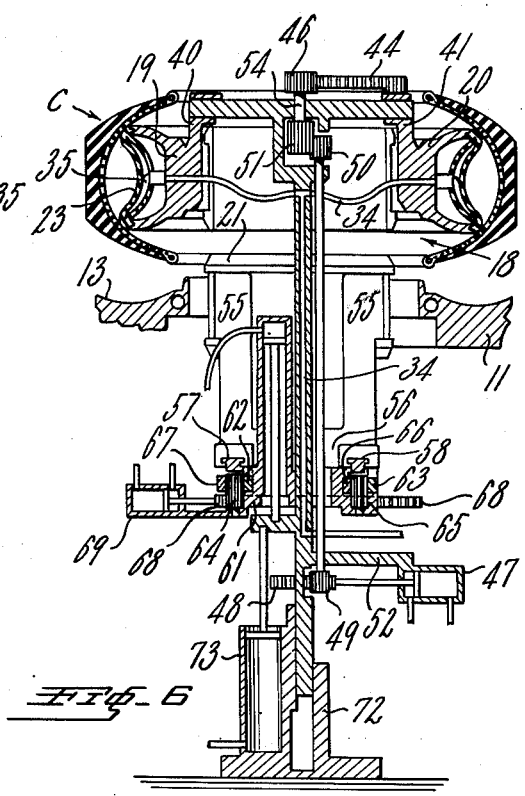

Sept. 18, 1956   C. A. OSTLING ET AL   2,763,317
METHOD AND APPARATUS FOR FORMING TIRES
Filed Aug. 10, 1953   6 Sheets-Sheet 5
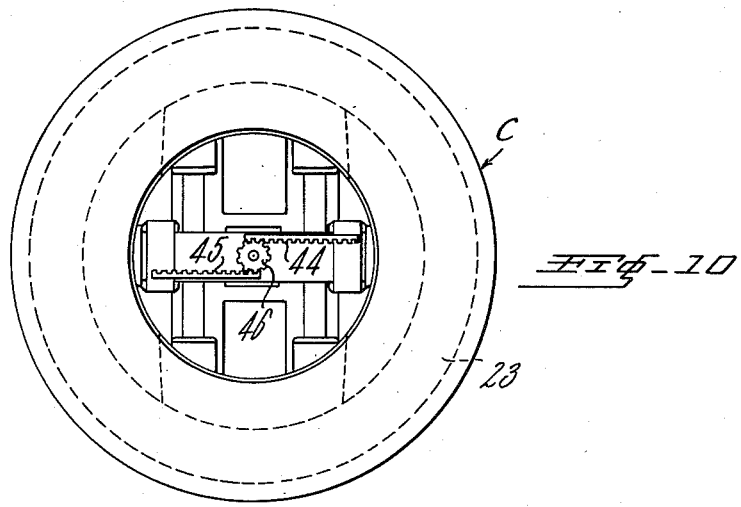
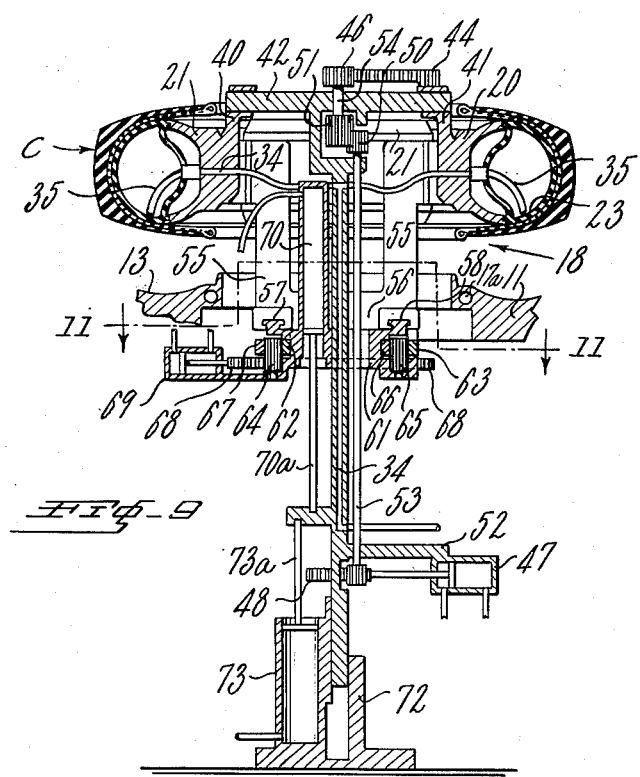
INVENTORS
CARL A. OSTLING
HOLLIS C. HODGKINS
BY
Irwin M. Lewis
ATTORNEY Sept. 18, 1956 C. A. OSTLING ET AL 2,763,317
METHOD AND APPARATUS FOR FORMING TIRES
Filed Aug. 10, 1953 6 Sheets-Sheet 6
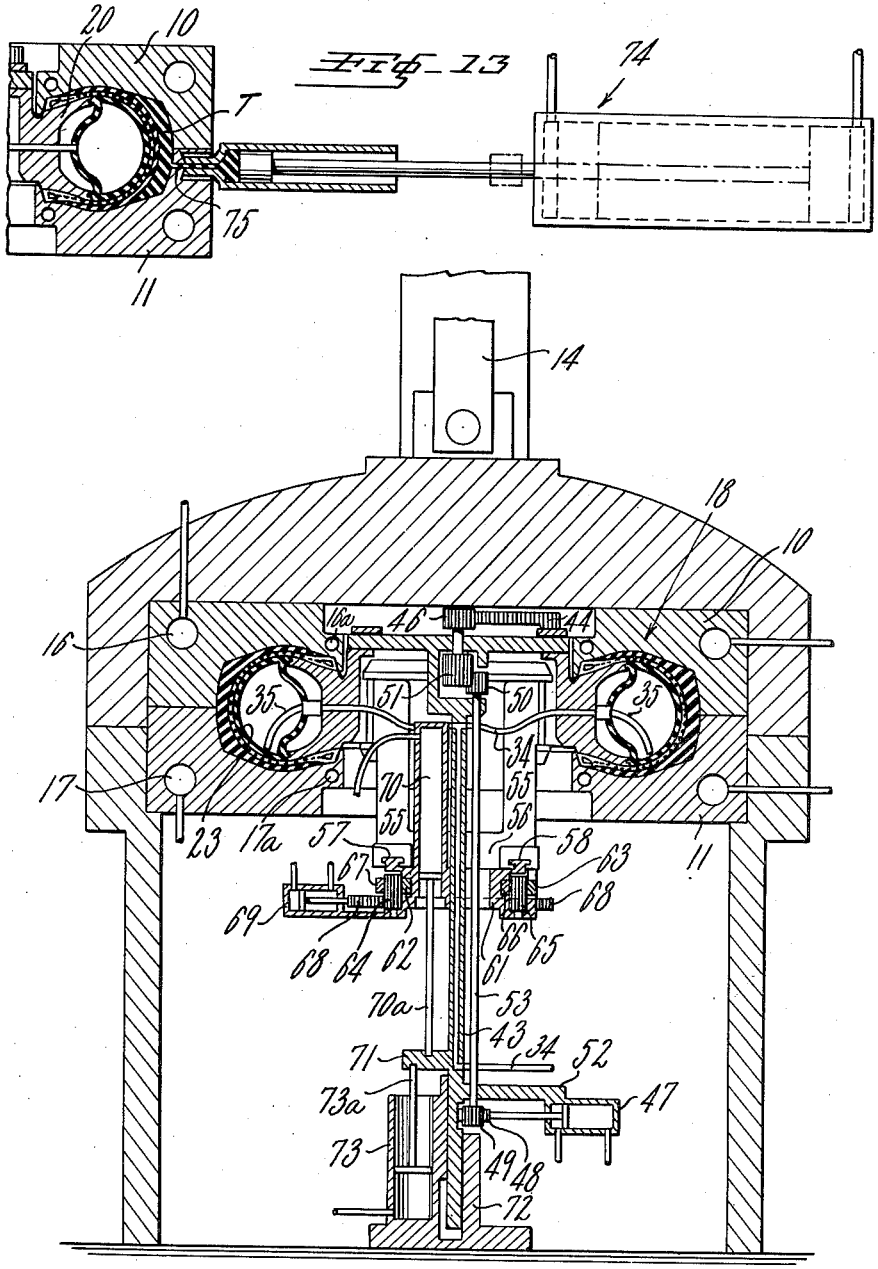
INVENTORS
CARL A. OSTLING
HOLLIS C. HODGKINS
BY
Irwin M. Lewis
ATTORNEY

United States Patent Office 2,763,317
Patented Sept. 18, 1956

2,763,317
METHOD AND APPARATUS FOR FORMING TIRES

Carl A. Ostling, New York, N. Y., and Hollis C. Hodgkins, Fort Lee, N. J., assignors to United States Rubber Company, New York, N. Y., a corporation of New Jersey Application August 10, 1953, Serial No. 373,184

14 Claims. (Cl. 154—9)

This invention relates to a method and apparatus for forming a pneumatic tire casing from a cylindrical band shaped carcass of vulcanizable rubber and fabric having inextensible bead portions to which the fabric is anchored.

The practice heretofore used in forming tires from a band shaped carcass was to shape the carcass to approximate tire shape and then expand and stretch the so shaped carcass to finished tire shape in a heated tire mold by means of an inflatable, annular rubber tube, commonly known as a "curing bag" or by an inflatable diaphragm such as shown in U. S. Patent No. 2,495,663 to Soderquist.

Prior to the inflation of the curing bag or diaphragm, no forming of the tire was performed. When the curing bag or diaphragm was inflated, all portions of the tire, including the bead and sidewall portions, were formed substantially simultaneously. As the bead and sidewalls were neither formed nor supported prior to or during the initial expanding of the carcass to finished tire shape, the fabric was free to shift and would often pull away from the beads or the beads would turn or roll under the influence of the expanding force to thereby relieve the tension in the fabric. This resulted in non-uniform tensioning of the fabric which in turn caused both radial and lateral distortion of the tire when it was removed from the tire mold. If the distortion was severe, the tire would have to be scrapped. This uncontrolled movement of the fabric in the bead and sidewall portions of the tire also resulted in varying cross sectional thickness due to displacement of the fabric so that tires so formed often had poor balance.

These disadvantages of prior practice are eliminated in the method of the present invention by first shaping the band shaped carcass to approximate tire shape without substantially stretching the fabric thereof and while the fabric is in a substantially unstretched condition, clamping the bead portions and a substantial portion of the sidewalls of the carcass between unyielding surfaces to form and anchor these critical portions. Thereafter, while these portions are so clamped, the remaining portion of the carcass is expanded and stretched to finished tire shape. The carcass is continuously heated during these operations and the heating thereof is continued until the rubber is vulcanized.

By this method, the bead portions and a substantial portion of the sidewalls are formed prior to and are supported and anchored during the expanding and stretching of the carcass, thereby eliminating the rolling or pulling of the fabric from the bead portions and the non-uniformed tensioning of the fabric caused thereby. The bead and sidewall being initially formed, anchored and supported, there is substantially no displacement or movement of the fabric in these portions during the subsequent stretching of the remaining portions of the carcass with the result that a tire so produced is much more uniform than those produced by other methods.

The apparatus of the present invention includes a heated tire mold provided with an annular cavity of the desired tire shape and an annular core member which, in conjunction with the tire mold, serves to form the tire. The inner circumferential portion of the core member, corresponding in shape to the beads and approximately one-half of the sidewall portions of the finished tire, is made of a rigid unyielding material and serves in conjunction with the tire mold to form and initially anchor the bead portions and substantially one-half the sidewall portions. The outer circumferential portion of the core member is formed of a flexible, and inflatable annular tube which may be expanded to shape and form the remaining portion of the tire after the bead and sidewall portions of the tire have been initially formed and anchored between the inner rigid portion of the core member and the corresponding portion of the tire mold cavity.

The inner rigid portion of the core member is made up of a plurality of movable segments which permit the core member to be collapsed to facilitate the positioning of a band shaped carcass thereover and the removal of a finished tire therefrom. A special mounting structure and actuating means are provided for the core member to permit it to be moved relative to the tire mold to facilitate the forming of the tire, the positioning of the carcass over the core and the removal of the finished tire. The apparatus is particularly adapted to be substituted for the conventional expandable diaphragm used in a press of the type shown in U. S. Patent No. 2,495,663 to Soderquist.

The method and apparatus of the present invention is adapted to be used in forming a tire from a band shaped carcass to which the tread, subtread and sidewall stock has been applied in the conventional manner, or may be used in forming the tire from a band shaped carcass to which the subtread and sidewall stock has been applied but to which no tread stock has been applied so that the tread stock may be injected onto the crown of the tire during the forming of the tire in the tire mold as disclosed in copending application Serial No. 365,196, filed June 30, 1953, by Carl A. Ostling, now U. S. 2,724,425.

The present invention is particularly useful in the manufacture of tires incorporating synthetic textile reinforcing fabric such as rayon or nylon. Such fabrics when incorporated in a tire unless specially treated exhibit the tendency to "grow" or to gradually increase in size and service. In co-pending application Serial No. 212,132, filed February 21, 1951, by Martin Castricum and Francis C. Kennedy, now abandoned, it was proposed to make the carcass undersized and to then stretch the carcass to the desired finished size in the tire vulcanizing mold prior to vulcanization to remove a major portion of the stretch of the fabric and thereby diminish the tendency of the finished tire to "grow." In U. S. Patent No. 2,625,980 to Martin Castricum and in U. S. Patent No. 2,625,981 to Edward H. Wallace, it was recognized that in stretching the carcass in the tire mold there was a tendency for the fabric to pull away from the beads under the influence of the stretching force and it was proposed to preliminarily vulcanize the bead areas of the carcass prior to the stretching of the carcass and final vulcanizing of the remainder of the carcass to thereby anchor the fabric to the beads. By utilizing the present invention, the tendency of the fabric to pull away from the beads and in addition the tendency of the beads to be displaced under the influence of the subsequent stretching of the fabric is further minimized by the anchoring and forming of the bead areas between unyielding surfaces prior to the stretching of the fabric.

Other objects and advantages of the present invention will become apparent from the following description when read in conjunction with the accompanying drawings wherein:

Fig. 2 is an enlarged plan view, with parts broken away, of the collapsible core member in expanded condition showing the details of the inner rigid segments and the outer inflatable tube forming the core member;

Fig. 3 is a sectional view taken on the line 3—3 of Fig. 2;

Fig. 4 is an enlarged plan view of the collapsible core member in collapsed condition;

Fig. 5 is an enlarged plan view of the collapsible core member in collapsed condition showing a band shaped carcass in place thereover;

Fig. 6 is a sectional elevational view of the core member and actuating mechanism therefor showing two inner rigid segments of the core member in expanded position and two segments in a radially inwardly and axially downwardly retracted position;

Fig. 7 is a plan view of the apparatus in the position shown in Fig. 6;

Fig. 8 is a sectional elevational view similar to that of Fig. 6, but showing two segments in an expanded position and the other two segments in an elevated position but radially retracted position;

Fig. 9 is a sectional elevational view similar to that of Fig. 8, but showing all of the core segments in an expanded position and the annular tube forming the outer portion of the core in an inflated condition to shape the carcass to approximate tire shape;

Fig. 10 is a plan view of the apparatus in the position as shown in Fig. 9;

Fig. 11 is a sectional view taken on the line 11—11 of Fig. 9 showing the details of the mechanism for moving certain of the segments;

Fig. 12 is a sectional elevational view showing the core member completely expanded and the mold halves closed to shape and form the carcass into finished tire form;

Fig. 13 is a partial sectional view showing how the apparatus of the present invention may be modified to permit injection of tread stock onto the carcass during the shaping and forming of the carcass in the tire mold.

Figure 1:
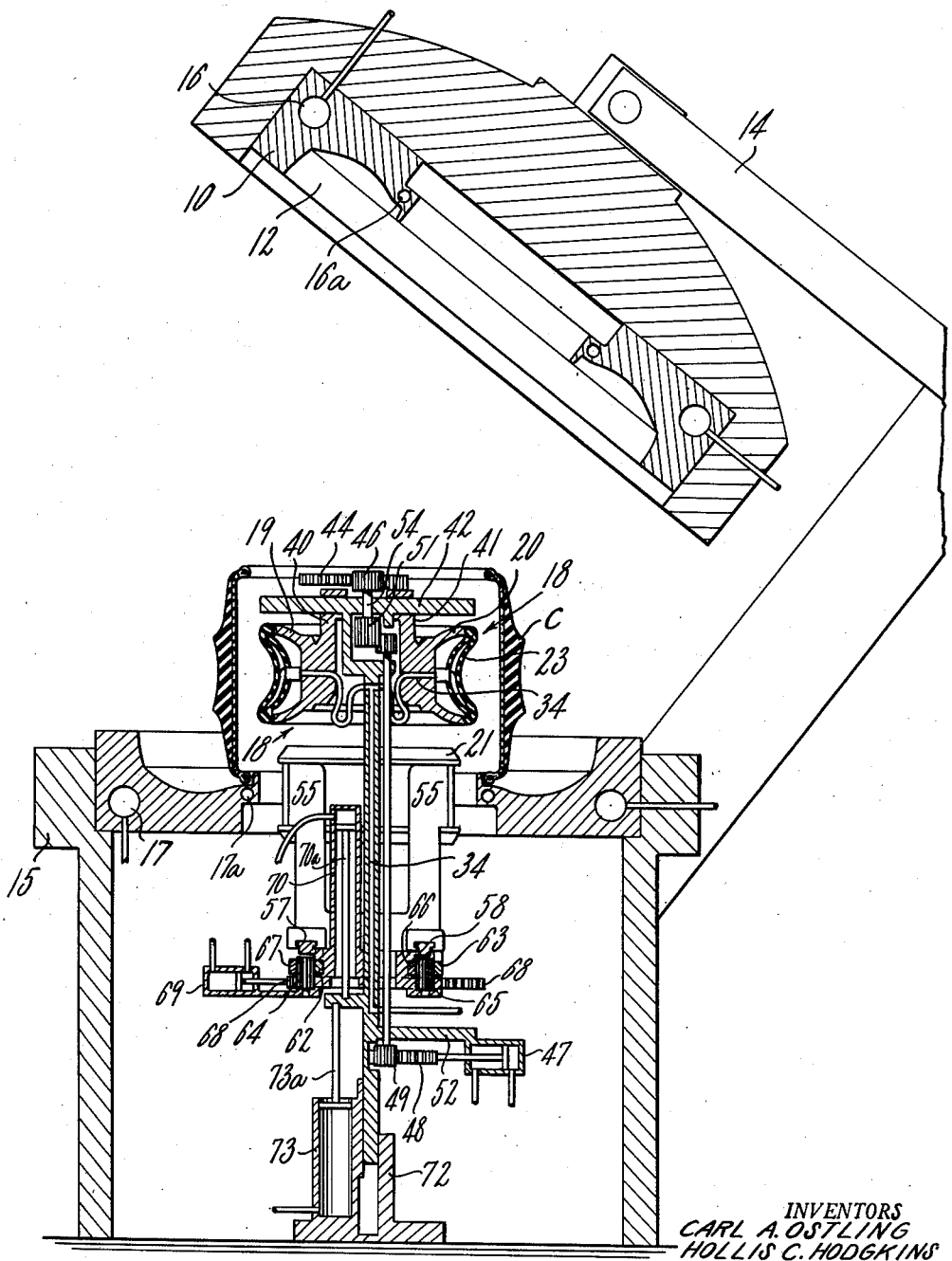
Fig. 1 is a sectional elevational view of the apparatus of the present invention showing the core member in completely collapsed condition with a tire carcass positioned thereover preparatory to shaping and forming the carcass.

Referring to the drawings and in particular to Fig. 1 of the drawings, the apparatus of the present invention includes a two part tire mold consisting of a movable annular mold half 10 and a stationary annular mold half 11 provided respectively with complementary mold cavities 12 and 13 so that when the two mold halves are placed together they form a single confining cavity of the desired tire shape. The movable mold half 10 is supported on an arm 14 and is moved into position over the stationary half as shown in Fig. 12 by a suitable mechanism (not shown) such as illustrated in U. S. Patent No. 2,495,663. The stationary mold half 11 is supported on a suitable base 15.

The mold halves 10 and 11 are provided with passageways 16 and 17 respectively through which a suitable heating medium such as hot water or steam may be circulated to heat the molds to the desired vulcanizing temperature.

Additional passageways 16a and 17a may be provided to permit localized heating for preliminarily vulcanizing the bead portions of the tire.

*Collapsible core assembly*

The annular collapsible curing form or core assembly of the present invention, around which a tire carcass C in band form is adapted to be placed, is generally designated by the reference numeral 18. The core 18 is mounted above the lower mold half 11 so that when it is expanded and the mold half 10 is closed, it will be confined in the molding cavity and assist in forming and shaping the carcass C. The carcass C is a conventional form and is fabricated from a plurality of plies of reinforcing fabric, inextensible bead rings, and layers of sidewall, subtread and tread rubber on a tire building drum as is conventional practice.

As best shown in Figs. 2 and 3, the inner circumferential half of the core member 18 is formed by rigid, arcuate segments 19, 20, 21 and 22 and the outer circumferential half is formed by flexible, inflatable annular tube 23 which surrounds all the segments and is attached to segments 19 and 20. The segments 19, 20, 21 and 22 are generally C-shaped in cross section and are formed of a rigid material such as steel. The outer surfaces of the segments have a contour corresponding to that desired for the interior surface of the bead and approximately one-half of the sidewall portions of the finished tire.

The tube 23 is fabricated from two formed sheets of an impervious material, such as rubber or rubber substitutes, bonded together at their lateral edges to form annular ribs 24 and 25. The ribs 24 and 25 fit into grooves 26 and 27 formed in the edge of the segments 19 and 20 and are anchored therein by clamping strips 28 and 29 and screws 30 and 31 so that the tube 23 is secured to the segments 19 and 20. The tube 23 is not secured to the segments 21 and 22 but the ribs 24 and 25 are adapted to be received in grooves 32 and 33 formed in the edges of these segments when the core is expanded as shown in Figs. 2 and 3 so that the tube 23 is thereby supported and backed up by the segments 21 and 22. When the core is collapsed, the segments 21 and 22 are disengaged from the tube 23 as shown in dashed lines in Fig. 3. The sidewalls of the grooves 32 and 33 are tapered to facilitate the entry of the ribs 24 and 25 therein.

Heated fluid under pressure, such as hot water, is introduced into the tube 23 through a connecting conduit 34 and a flexible siphon tube 35 to inflate and expand the tube. Siphon tube 35 insures that all water is removed when the tube 23 is deflated.

Segments 21 and 22 are movable radially inwardly and axially downwardly and segments 19 and 20 are movable only radially inwardly. The core 18 is collapsed by first deflating the tube 23, then moving the segments 21 and 22 radially inwardly and axially downwardly and then moving the segments 19 and 20 radially inwardly. The core in collapsed condition is shown in Fig. 4. Helical extension springs 36, 37 and 38 and 39, which are normally under tension when the core 18 is in expanded condition, serve to fold the portion of the tube normally supported by the segments 21 and 22 into the space left when these segments 21 and 22 are moved radially inwardly and axially downwardly. Springs 37 and 36 are attached at one end to that portion of the tube 23 which is normally supported by the segment 21 and are secured at their other ends to supporting arms 40 and 41 (Fig. 2) of segments 19 and 20 respectively. Springs 38 and 39 are attached at one end to the portion of the tube 23 which is normally supported by the segment 22 and at their other ends to the supporting arms 40 and 41 respectively.

As shown in Fig. 1, the segments 19 and 20 are slidably mounted for radial movement on a transversely extending way 42 by means of supporting arms 40 and 41. The way 42 is secured to the top of a vertically extending standard 43 which extends up through the lower stationary mold half 11. A rack 44 is secured at one end to supporting arm 41 and a rack 45 (Fig. 7) is secured at one end to the supporting arm 40. The racks 44 and 45 extend toward the center of the way 42 and mesh with a common pinion 46. Rotation of pinion 46 in one direction, therefore, serves to move the segments 19 and 20 radially outwardly and rotation in the other direction serves to move the segments 19 and 20 radially inwardly.

Pinion 46 is rotated by means of a fluid actuated cylinder 47 through a gear train consisting of a rack 48, pinion 49, pinion 50 and a gear 51. Air cylinder 47 is secured to a bracket 52 which extend from the lower end of the standard 43 and the rack 48 is secured to the end of the piston rod of the cylinder 47. Rack 48 meshes with pinion 49 which is secured to the lower end of a vertically extending shaft 53 and reciprocation of rack 48 serves to rotate pinion 49, shaft 53 and pinion 50 which is secured to the upper end of the shaft 53. Pinion 50 meshes with gear 51 which is attached to the lower end of a short section of shaft 54. Rotation of pinion 50 serves to rotate gear 51, shaft 54 and pinion 46 which is attached to the upper end of the shaft 54. Admission of fluid under pressure to the cylinder 47, therefore, serves to move the segments 19 and 20 radially inwardly or outwardly.

As best shown in Figs. 1 and 11, the segment 21 is secured to a pair of upwardly extending arms 55 of a carriage 56. The carriage 56 in turn is slidably mounted for transverse movement on transversely extending, parallel ways 57 and 58. Segment 2 is similarly secured to upwardly extending arms 59 of a carriage 60 which is also slidably mounted on the opposite ends of the ways 57 and 58. The ways 57 and 58 are secured to a platform 61 which is slidably mounted for vertical movement on the standard 43.

Racks 62 and 63 are secured to the carriage 56 on opposite sides thereof and meshed respectively with pinions 64 and 65 which are suitably journaled in the platform 61. Similar racks 66 and 67 are secured to the carriage 60 on opposite sides thereof and also mesh with pinions 64 and 65 on opposite sides thereof from the racks 62 and 63. Rotation of pinions 64 and 65 in one direction moves the carriages 56 and 60 and the segments 21 and 22 secured thereto simultaneously towards each other and rotation of the pinion 64 and 65 in the opposite direction moves the carriages 56 and 60 and the segments 21 and 22 carried thereby away from each other.

The pinions 64 and 65 are engaged by a rack 68 which is secured to the piston rod of a fluid actuated cylinder 69. Admission of fluid under pressure to the cylinder 69, therefore, serves to reciprocate the rack 68 and thereby rotate the pinions 64 and 65 to move carriages 56 and 60 and the segments 21 and 22 supported thereby toward or away from each other. The cylinder 69 is secured to the platform 61.

As previously described, the platform 61 is slidably mounted for vertical movement on the standard 43. The platform is elevated with respect to the standard 43 by admission of fluid under pressure to a vertically extending fluid actuated cylinder 70 which is secured to the platform 61. The end of the piston rod 70a of the cylinder 70 is attached to a bracket 71 which extends from and is secured to the standard 43. Admission of fluid under pressure to the cylinder 70 to extend the piston rod 70a thereof serves to elevate the platform 61 and the segments 21 and 22 supported thereon to bring them into alignment with the segments 19 and 20 and the inflatable tube 23.

The lower end of the standard 43 is slidably mounted for vertical movement in a base 72 so that the curing form 18, as a unit, may be raised above the lower mold half 11 to facilitate placement of the carcass around the core 18 and removal of the finished tire. The standard 43 is raised by means of a fluid actuated cylinder 73 which is secured to the base 72. The piston rod 73a of the cylinder 73 is attached to the bracket 71 so that admission of fluid under pressure to the cylinder 72 to extend the piston rod 73a thereof, elevates the standard 43 and the core 18 carried thereby.

*Operation*

In Fig. 1 the apparatus is shown in its initial operating condition. The inflatable tube 23 is deflated. Segments 19 and 20 are in their radially retracted position and the segments 21 and 22 are in their radially retracted and lowered position. The core 18, as a unit, is in an elevated position with pressure on the cylinder 73 to hold it in this position. The mold half 10 is in open position.

Preparatory to initiating the operation, a previously fabricated raw tire carcass C is placed over and around the collapsed core 18. As best shown in Fig. 5, the carcass may be easily placed over the core 18 by deforming it to a slightly elliptical shape. One bead of the carcass C rests on the lower mold half 11.

After placing the carcass over the collapsed core 18, fluid under pressure is admitted to the cylinder 47 to move the segments 19 and 20 radially outwardly to the position shown in Figs. 6 and 7.

After the segments 19 and 20 have been moved to the position shown in Figs. 6 and 7, fluid under pressure is admitted to cylinder 70 to elevate the segments 21 and 22 to the position shown in Fig. 8. Fluid under pressure is then admitted to the cylinder 69 to move the segments 21 and 22 radially outwardly to the position shown in Figs. 9 and 10. As the segments 21 and 22 are moved radially outwardly, the ribs 24 and 25 of the tube 23 are engaged and supported in the groove 32 and 33 as shown in Fig. 3.

After the segments 21 and 22 have been moved radially outwardly to the position shown in Fig. 10, heated fluid under pressure is admitted to the tube 23 to inflate it only an amount to shape the carcass C to approximate tire shape without stretching the fabric of the carcass. The mold half 10 is then moved over the mold half 11 to confine the carcass and the core 18 within the mold cavity as shown in Fig. 12. As the mold half 10 is closed, the pressure on the cylinder 73 is released to allow the core 18 to move downwardly into the cavity 13 of the lower mold half 11.

Upon closing of the mold half 10, the beads and substantially one-half of the sidewall portions of the carcass are clamped and formed between the wall of the mold cavity and the exterior surfaces of the rigid core segments 19, 20, 21 and 22. The mold halves 10 and 11 are heated by the circulation of hot water or steam through the passageways 16, 16a, 17 and 17a. Initially, steam or hot water may be circulated only through passageways 16a and 17a so that only the bead areas are initially subjected to vulcanizing heat, and are formed and vulcanized to further anchor the fabric to the bead prior to the forming and vulcanizing of the remainder of the carcass. After an elapse of a few seconds, the pressure in the tube 23 is increased to form and shape the remaining portion of the carcass. In this manner, the bead portions and a substantial portion of the sidewalls are formed prior to and are supported and anchored during the forming and shaping of the remaining portion of the carcass, thereby eliminating rolling of the beads or pulling of the fabric from the bead portions and the non-uniform tensioning of the fabric caused thereby. The bead and sidewall portions being initially formed, anchored and supported, there is substantially no displacement or movement of the fabric in these portions during the subsequent shaping and forming of the remaining portion of the carcass.

The carcass C is left in the heated tire mold until it receives the proper degree of vulcanization. The tube 23 is next deflated and collapsed by the application of vacuum to conduit 34. The segments 21 and 22 are retracted radially by the admission of pressure to the cylinder 69 to extend the piston rod thereof, and the pressure on the cylinder 70 is released to allow the platform 61 and the segments 21 and 22 supported thereby to move to the lowered position as shown in Fig. 1. The segments 19 and 20 are then retracted radially by admission of fluid under pressure to the cylinder 47 to retract the piston rod thereof. The upper mold half 10 is then raised and simultaneous therewith fluid under pressure is admitted to the cylinder 73 to raise the standard 43 and the curing form 18 carried thereby to the position shown in Fig. 1. A suitable control circuit system, not shown, to energize the various air cylinders in the proper timed sequence may be provided if desired.

Modification

The apparatus of the invention has been described above in conjunction with the forming of a tire casing from a band shaped carcass to which the tread, subtread, and sidewall stock has been applied in the conventional manner before the molding operation.

In Fig. 13, there is shown how the apparatus of the present invention may be modified by the addition of an injection unit 74 so that the apparatus may be used to inject the tread stock onto the carcass while the carcass is confined in the molding cavity of the tire mold as described in copending application, Serial No. 365,196, filed June 30, 1953, by Carl A. Ostling.

As shown in Fig. 13, the lower mold half 11 is provided with an opening 75 communicating with the crown portion of the molding cavity through which tread stock T may be injected by the injection unit 74. The injection unit 74 is of the type described in U. S. Patent No. 2,533,468 to Jurgeleit.

The carcass C' is fabricated in the conventional manner except that no tread stock is applied to the carcass prior to its confinement in the tire mold. The carcass C' is placed over the core 18 and is shaped and confined in the mold as previously described in conjunction with the forming of the conventional carcass. Only sufficient pressure is maintained in the tube 23 to shape the carcass so that a space is left between the crown of the carcass and the wall of the cavity of the mold. Tread stock T is then injected into this space to form the tread. After injection of the tread stock, the pressure in the tube 23 may be increased to compact the injected tread stock and the carcass heated until properly vulcanized. A sufficient period of time may be allowed to elapse before the injection of the tread stock T to permit the bead areas to become partially vulcanized to thereby further anchor the fabric to the beads prior to the injection of the tread stock and the increasing of the pressure in the tube 23.

From the above description it can be seen that there is provided a novel method and apparatus for forming a pneumatic tire casing, the use of which will minimize the defects which commonly cause poor balance and non-uniformity in pneumatic tire casings. The method and apparatus is particularly useful in forming a pneumatic tire incorporating synthetic reinforcing fabrics such as rayon or nylon as the reinforcing fabric may be highly stretched during the forming of the tire in the mold to thereby remove a major portion of the stretch thereof without danger of the fabric pulling away from the bears or the bead portions being displaced under the influence of the stretching force. While certain preferred forms of the invention have been described, it is to be understood that modification may be made therein without departing from the spirit and scope of the invention.

Having thus described our invention, what we claim and desire to protect by Letters Patent is:

1. The method of making a tire casing comprising, forming in a band form a tire carcass of rubber and fabric having bead portions, shaping said carcass to approximate tire shape without substantially stretching the fabric thereof, clamping the bead portions of said carcass and substantially one-half the sidewall portion of the carcass adjacent the bead portions between unyielding surfaces while the fabric of the carcass is in a substantially unstretched condition to thereby form and anchor said portions, heating the carcass, expanding the remainder of the carcass to final tire shape while the bead portions and said sidewall portions are clamped and continuing the heating of the carcass while it is in the expanded condition until the rubber is vulcanized.

2. The method of making a tire casing comprising, forming in band form a tire carcass of rubber and fabric having bead portions, shaping said carcass to approximate tire shape without substantially stretching the fabric thereof, clamping the bead portions and approximately one-half of the sidewall portions adjacent the bead portions between unyielding surfaces while the fabric is in an unstretched condition to thereby form and anchor said bead and sidewall portions, heating said carcass, applying sufficient pressure to the interior of said carcass to shape the remaining portion of the carcass while said bead and sidewall portions are clamped, injecting a rubber tread on the crown of said carcass while maintaining said pressure within said cracass and continuing the heating of said carcass to vulcanize the rubber.

3. The method of making a tire casing comprising, forming in band form a tire carcass of rubber and fabric having bead portions, shaping said carcass to approximate tire shape without substantially stretching the fabric, clamping the bead portions and substantially one-half of the sidewall portions adjacent the bead portions between a rigid core and the wall of a tire mold while the fabric is in a substantially unstretched condition to thereby form and anchor said portions, heating the tire carcass, applying sufficient pressure to the interior surface of the remaining portion of the carcass while said bead and sidewall portions are clamped to expand said remaining portions of the carcass against the wall of the mold to completely shape the carcass to final tire shape, and continuing the heating of the carcass to vulcanize the rubber.

4. The method of making a tire casing comprising, forming in band form a tire carcass of rubber and fabric having bead portions, shaping said carcass to approximate tire shape without substantially stretching the fabric, clamping the bead portions and substantially one-half the sidewall portions adjacent the bead portions between a rigid core piece and the wall of a tire mold while the fabric is in an unstretched condition to thereby form and anchor said portions, heating the tire carcass, and while said bead and sidewall portions are still clamped applying only sufficient pressure to the interior surface of the carcass to shape the remaining portion of the carcass without materially stretching the crown of the carcass so as to leave a space between the crown of the carcass and the wall of the mold cavity, injecting tread rubber into said space to form a tread, and continuing the heating of the carcass to vulcanize the rubber.

5. Apparatus for manufacturing tire casings comprising, a mold having an annular cavity of a shape corresponding to the exterior shape of a finished tire, an annular core member having an exterior shape corresponding to the interior surface of a finished tire, the inner circumferential portion of said core member corresponding in shape to the shape of the beads and substantially one-half of the sidewall portions of a finished tire being rigid and unyielding so that said portions of the tire will be clamped and anchored between said inner portion of the core member and the corresponding portion of the annular cavity of the mold and be formed thereby, the remaining portion of said core being flexible and expansible and contractable under fluid pressure, and means for introducing fluid under pressure into said remaining portion of the core to thereby expand it to shape the remaining portion of the tire and press it against the remaining portion of the mold cavity to thereby form said remaining portion of the tire.

6. Apparatus for manufacturing tire casings comprising, a mold having an annular cavity of a shape corresponding to the exterior shape of a finished tire, an annular core member having an exterior shape corresponding to the interior surface of the finished tire, the inner circumferential portion of said core member corresponding in shape to the shape of the bead and substantially one-half the sidewall portions of a finished tire being rigid and unyielding so that said portions of the tire will be clamped and anchored between said inner circumferential portions of the core member and the corresponding portion of the annular cavity of the mold and be formed thereby, the remaining outer circumferential portion of the core being hollow and expansible under fluid pressure, means for introducing fluid under pressure into said hollow remaining portion of the core to thereby expand it to shape the remaining portion of the tire and press it against the remaining portion of the mold cavity, and means for injecting tread stock into said mold cavity.

7. Apparatus for use in forming a tire casing from a band shaped carcass, comprising, a plurality of separate, rigid, arcuate segments which together form an annular core, a flexible, inflatable, hollow rubber tube surrounding said segments as a group, said tube being attached to some of said segments and not attached to other of said segments, and means for moving said segments to which said tube is not attached radially inwardly, means for inflating and collapsing said tube, and means for folding portions of said tube into the space left when said segments to which the tube is not attached are moved radially inwardly.

8. Apparatus for use in forming a tire casing from a band shaped carcass comprising, a plurality of separate, rigid, arcuate segments which together form an annular core, a flexible, inflatable hollow tube surrounding said segments as a group, said tube being attached to some of said segments and not attached to other of said segments, means for moving said segments to which the tube is not attached away from said segments to which the tube is attached, means for inflating and collapsing said tube and means for folding the portions of said tube extending between said segments to which it is attached into the space left when said elements to which it is not attached are moved away from said segments to which it is attached.

9. Apparatus for use in forming a tire casing from a band shaped carcass comprising, a plurality of separate, rigid, arcuate segments which together form an annular core, a flexible, inflatable hollow tube surrounding said segments as a group, said tube being attached to some of said segments and not attached to other of said segments, means for moving said segments to which said tube is not attached radially inwardly and axially away from the segments to which the tube is attached, means for inflating and collapsing said tube and means for folding the portions of said tube extending between said segments to which the tube is attached into the space left when said segments to which the tube is not attached are moved radially inwardly and axially away from said segments to which the tube is attached.

10. Apparatus for use in forming a tire casing from a band shaped carcass comprising, a plurality of separate, rigid, arcuate segments, which together form an annular core, a flexible, inflatable hollow tube surrounding said segments as a group, said tube being attached to some of said segments and not attached to other of said segments, means for moving all of said segments radially inwardly, means for moving said segments to which the tube is not attached axially away from said segments to which the tube is attached, and means for folding portions of said tube extending between said segments to which it is attached into the spaces left when said segments to which it is not attached are moved radially inwardly and axially away from said segments to which it is attached.

11. Apparatus for forming a tire casing from a band shaped carcass comprising, a two part tire mold in which the two parts are movable relative to each other to permit the loading of a tire carcass in the mold and removal of a molded tire, the two parts in assembled position providing an annular tire molding cavity, an annular core assembly for said cavity, said core assembly being formed by a plurality of radially movable, rigid, arcuate segments and a flexible, inflatable hollow tube which surrounds the segments as a group and is attached to some of said segments, the exterior surface of said rigid arcuate segments as a group corresponding in shape to the interior surface of the bead portions and a substantial portion of the sidewall portions of a finished tire to thereby form said portions of the tire, said inflatable tube serving when inflated to form in conjunction with the cavity of the tire mold the remaining portion of the tire, means for inflating and collapsing said tube and means for moving said segments radially inwardly.

12. Apparatus for forming a tire casing from a band shaped carcass comprising, a two part tire mold in which the two parts are movable relative to each other to permit the loading of a tire carcass in the mold and removal of a molded tire, the two parts in assembled position providing an annular tire molding cavity, an annular core assembly for said cavity, said core assembly being formed from a plurality of radially movable, rigid, arcuate segments and a flexible, inflatable hollow tube which surrounds the segments and is attached to some of said segments, the exterior surface of said rigid arcuate segments as a group corresponding in shape to the interior surface of the bead portions and a substantial portion of the sidewall portion of a finished tire to thereby form said portions of the tire, said inflatable tube serving when inflated to form in conjunction with the cavity of the tire mold the remaining portion of the tire, means for inflating and collapsing said tube, means for moving said segments radially inwardly, and means for moving said annular core assembly relative to said mold parts to permit removal of a molded tire.

13. Apparatus for forming a tire from a band shaped carcass comprising, a two part tire mold in which the two parts are movable relative to each other to permit the loading of a tire carcass in the mold and removal of a molded tire, the two parts in assembled position providing an annular tire molding cavity, an annular core assembly for said cavity, said core assembly being formed from a plurality of radially movable, rigid, arcuate segments and a flexible, inflatable hollow tube which surrounds the segments and is attached to some of said segments and not attached to other of said segments, means for moving all of said segments radially inwardly, means for moving said segments to which the tube is not attached axially away from the segments to which the tube is attached, means for inflating and deflating said tube, means for folding portions of said tube extending between the segments to which it is attached into the space left when said segments to which it is not attached are moved axially away from the segments to which it is attached, and means for moving the core assembly axially away from one part of said mold to permit the removal of a molded tire.

14. Apparatus for use in forming a tire casing from a band shaped carcass comprising, a plurality of separate, rigid, arcuate segments which together form an annular core, a flexible inflatable, hollow tube surrounding said segments as a group, said tube being attached to some of said segments, means for moving some of said segments radially inwardly and axially away from the remaining segments and means for moving said remaining segments radially into the space left when said some of said segments are moved radially inwardly and axially away from said remaining segments.

References Cited in the file of this patent

UNITED STATES PATENTS

| | | |
|---|---|---|
| 1,456,425 | DeMattia | May 22, 1923 |
| 2,476,884 | Maynard | July 19, 1949 |
| 2,495,663 | Soderquist | Jan. 24, 1950 |
| 2,625,981 | Wallace | Jan. 20, 1953 |
| 2,700,795 | Kraft | Feb. 1, 1955 |